(12) United States Patent
Yahata

(10) Patent No.: US 11,356,616 B2
(45) Date of Patent: Jun. 7, 2022

(54) IMAGE PROCESSING DEVICE, IMAGE CAPTURING DEVICE, CONTROL METHOD OF IMAGE PROCESSING DEVICE, CONTROL METHOD OF IMAGE CAPTURING DEVICE, AND STORAGE MEDIUM

(71) Applicant: CANON KABUSHIKI KAISHA, Tokyo (JP)

(72) Inventor: Kazuhiro Yahata, Kunitachi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 147 days.

(21) Appl. No.: 16/835,413

(22) Filed: Mar. 31, 2020

(65) Prior Publication Data

US 2020/0228698 A1   Jul. 16, 2020

Related U.S. Application Data

(63) Continuation of application No. PCT/JP2018/030191, filed on Aug. 13, 2018.

(30) Foreign Application Priority Data

Oct. 13, 2017 (JP) .............................. JP2017-199665

(51) Int. Cl.
*H04N 5/235* (2006.01)
*H04N 9/64* (2006.01)

(52) U.S. Cl.
CPC ........... *H04N 5/2355* (2013.01); *H04N 9/646* (2013.01)

(58) Field of Classification Search
CPC .... H04N 5/2355; H04N 5/217; H04N 5/2353; H04N 5/2351; H04N 5/243; H04N 9/646; H04N 1/407; G06T 5/00
See application file for complete search history.

(56) References Cited

U.S. PATENT DOCUMENTS 8,300,121 B2   10/2012   Yahata
9,818,176 B2   11/2017   Sasaki et al.
(Continued)

FOREIGN PATENT DOCUMENTS

JP   2000-13690 A   1/2000
JP   2006-157862 A   6/2006
(Continued)

OTHER PUBLICATIONS

Machine English Translation for JP-2014179779-A, Tsunai Shiro, Published on Sep. 2014 (Year: 2014).*
(Continued)

*Primary Examiner* — Nelson D. Hernández Hernández
(74) *Attorney, Agent, or Firm* — Venable LLP

(57) ABSTRACT

An image processing device that corrects an image captured by an imaging sensor is capable of setting an exposure condition for each of a plurality of regions and includes an acquisition unit configured to acquire the image by setting the exposure condition for each region in the imaging sensor, a derivation unit configured, regarding a boundary between a region of interest and at least one adjacent region adjacent to the region of interest in the image, to derive a correction amount in the region of interest based on pixel values of a boundary pixel group in contact with the boundary included in the region of interest and pixel values of a boundary pixel group in contact with the boundary included in the adjacent region, and a correction unit configured to correct pixel values of pixels in the region of interest based on the derived correction amount.

18 Claims, 16 Drawing Sheets

(56) References Cited

U.S. PATENT DOCUMENTS

| | | |
|---|---|---|
| 10,515,437 B2 | 12/2019 | Sasaki et al. |
| 2006/0103745 A1 | 5/2006 | Nagaishi et al. |
| 2015/0244915 A1* | 8/2015 | Kikuchi ............. H04N 5/23251 |
| | | 348/234 |

FOREIGN PATENT DOCUMENTS

| | | | | |
|---|---|---|---|---|
| JP | 2009-38479 A | 2/2009 | | |
| JP | 2014-179779 A | 9/2014 | | |
| JP | 2014179779 A | * | 9/2014 | ............. H04N 5/379 |

OTHER PUBLICATIONS

International Search Report dated Oct. 16, 2018, in International Patent Application No. PCT/JP2018/030191.

\* cited by examiner

| T=1/100 G=6dB | T=1/100 G=12dB | T=1/100 G=6dB | T=1/100 G=6dB | T=1/100 G=6dB | T=1/100 G=6dB | T=1/100 G=6dB | T=1/100 G=6dB | T=1/100 G=6dB | T=1/100 G=12dB |
|---|---|---|---|---|---|---|---|---|---|
| T=1/100 G=6dB | T=1/100 G=6dB | T=1/100 G=6dB | T=1/100 G=0dB | T=1/100 G=0dB | T=1/125 G=0dB | T=1/125 G=0dB | T=1/100 G=0dB | T=1/100 G=6dB | T=1/100 G=6dB |
| T=1/100 G=6dB | T=1/100 G=0dB | T=1/100 G=0dB | T=1/125 G=0dB | T=1/160 G=0dB | T=1/160 G=0dB | T=1/125 G=0dB | T=1/100 G=0dB | T=1/100 G=0dB | T=1/100 G=6dB |
| T=1/100 G=0dB | T=1/100 G=0dB | T=1/125 G=0dB | T=1/160 G=0dB | T=1/200 G=0dB | T=1/200 G=0dB | T=1/160 G=0dB | T=1/125 G=0dB | T=1/100 G=0dB | T=1/100 G=0dB |
| T=1/125 G=0dB | T=1/160 G=0dB | T=1/200 G=0dB | T=1/320 G=0dB | T=1/320 G=0dB | T=1/200 G=0dB | T=1/160 G=0dB | T=1/125 G=0dB | T=1/100 G=0dB | T=1/100 G=6dB |
| T=1/100 G=0dB | T=1/125 G=0dB | T=1/160 G=0dB | T=1/200 G=0dB | T=1/200 G=0dB | T=1/160 G=0dB | T=1/125 G=0dB | T=1/100 G=0dB | T=1/100 G=0dB | T=1/100 G=6dB |
| T=1/100 G=6dB | T=1/100 G=0dB | T=1/125 G=0dB | T=1/160 G=0dB | T=1/160 G=0dB | T=1/125 G=0dB | T=1/100 G=0dB | T=1/100 G=0dB | T=1/100 G=6dB | T=1/100 G=6dB |
| T=1/100 G=6dB | T=1/100 G=6dB | T=1/100 G=0dB | T=1/125 G=0dB | T=1/125 G=0dB | T=1/100 G=0dB | T=1/100 G=0dB | T=1/100 G=6dB | T=1/100 G=6dB | T=1/100 G=6dB |
| T=1/100 G=6dB | T=1/100 G=6dB | T=1/100 G=6dB | T=1/100 G=0dB | T=1/100 G=0dB | T=1/100 G=6dB | T=1/100 G=6dB | T=1/100 G=6dB | T=1/100 G=6dB | T=1/100 G=6dB |
| T=1/100 G=12dB | T=1/100 G=6dB | T=1/100 G=6dB | T=1/100 G=6dB | T=1/100 G=6dB | T=1/100 G=6dB | T=1/100 G=6dB | T=1/100 G=6dB | T=1/100 G=6dB | T=1/100 G=12dB |

FIG.4

| x0.5 | x0.5 | x1 | x1.25 | x1.25 | x1 | x0.5 | x0.25 |
|---|---|---|---|---|---|---|---|
| x0.5 | x1 | x1.25 | x1.6 | x1.6 | x1.25 | x1 | x0.5 |
| x1 | x1.25 | x1.6 | x2.0 | x2.0 | x1.6 | x1.25 | x1 |
| x1.25 | x1.6 | x2.0 | x3.2 | x3.2 | x2.0 | x1.6 | x1.25 |
| x1 | x1.25 | x1.6 | x2.0 | x2.0 | x1.6 | x1.25 | x1 |
| x0.5 | x1 | x1.25 | x1.6 | x1.6 | x1.25 | x1 | x0.5 |
| x0.5 | x0.5 | x1 | x1.25 | x1.25 | x1 | x0.5 | x0.5 |
| x0.25 | x0.5 | x0.5 | x1 | x1 | x0.5 | x0.5 | x0.25 |

FIG.5

| T=1/100 G=5.9dB | T=1/100 G=6.1dB | T=1/100 G=0.1dB | T=1/125 G=0dB | T=1/100 G=0.1dB | T=1/100 G=6dB | T=1/100 G=6dB | T=1/100 G=12dB |
|---|---|---|---|---|---|---|---|
| T=1/100 G=5.9dB | T=1/100 G=0.1dB | T=1/100 G=0.1dB | T=1/160 G=0.1dB | T=1/100 G=6dB | T=1/100 G=5.9dB | T=1/100 G=0.1dB | T=1/100 G=6dB |
| T=1/100 G=-0.1dB | T=1/125 G=0dB | T=1/125 G=0dB | T=1/200 G=0.1dB | T=1/125 G=0dB | T=1/125 G=0dB | T=1/125 G=0dB | T=1/100 G=0dB |
| T=1/125 G=-0.1dB | T=1/160 G=0.1dB | T=1/160 G=0dB | T=1/200 G=0dB | T=1/160 G=0.1dB | T=1/160 G=0dB | T=1/160 G=0dB | T=1/100 G=0dB |
| T=1/125 G=0.1dB | T=1/200 G=0dB | T=1/200 G=0dB | T=1/320 G=-0.1dB | T=1/200 G=0dB | T=1/200 G=-0.1dB | T=1/125 G=0dB | T=1/100 G=0dB |
| T=1/100 G=0.1dB | T=1/200 G=0dB | T=1/320 G=-0.1dB | T=1/200 G=0dB | T=1/160 G=0dB | T=1/125 G=0dB | T=1/100 G=-0.1dB | T=1/100 G=6dB |
| T=1/100 G=6.1dB | T=1/160 G=0dB | T=1/200 G=0dB | T=1/160 G=0dB | T=1/125 G=0dB | T=1/100 G=0dB | T=1/100 G=6dB | T=1/100 G=6dB |
| T=1/100 G=12.1dB | T=1/100 G=6.1dB | T=1/100 G=0dB | T=1/125 G=0dB | T=1/100 G=0dB | T=1/100 G=6dB | T=1/100 G=6dB | T=1/100 G=12.1dB |

FIG.6A

| x1 | x1 | x1 | x1 | x1.014 | x1 | x1 | x1.014 |
|---|---|---|---|---|---|---|---|
| x1 | x0.986 | x1.014 | x1 | x1 | x1 | x1 | x1 |
| x1 | x1.014 | x1 | x1.014 | x1 | x1 | x0.986 | x1 |
| x1.014 | x1 | x1 | x1 | x1 | x1 | x1 | x1 |
| x1 | x1.014 | x1 | x0.986 | x1 | x0.986 | x1.014 | x1 |
| x1.014 | x1 | x1 | x1.014 | x1 | x1 | x1 | x1 |
| x1.014 | x1.014 | x1.014 | x1.014 | x1.014 | x1.014 | x1.014 | x1.014 |
| x0.986 | x0.986 | x0.986 | x0.986 | x1.014 | x1.014 | x1.014 | x1.014 |

FIG.6B

IMAGE PROCESSING DEVICE, IMAGE CAPTURING DEVICE, CONTROL METHOD OF IMAGE PROCESSING DEVICE, CONTROL METHOD OF IMAGE CAPTURING DEVICE, AND STORAGE MEDIUM

CROSS-REFERENCE TO RELATED APPLICATIONS

This application is a continuation of International Patent Application No. PCT/JP2018/030191, filed Aug. 13, 2018, which claims the benefit of Japanese Patent Application No. 2017-199665, filed Oct. 13, 2017, both of which are hereby incorporated by reference herein in their entirety.

BACKGROUND OF THE INVENTION

Field of the Invention

The present invention relates to a technology for controlling capturing of a high-dynamic-range image.

Background Art

Dynamic range of a camera is limited by the number of saturated electrons of an imaging sensor and bit accuracy after A/D conversion. A method of partially changing exposure of the imaging sensor in order to widen the dynamic range of the camera is disclosed (see Japanese Patent Laid-Open No. 2000-13690).

In Japanese Patent Laid-Open No. 2000-13690, in a method of partially changing exposure of the imaging sensor, the imaging sensor is divided into a plurality of regions, and the exposure (exposure time and analog gain) is set for each region. Then, in order to correct variance (difference) in the exposure setting for each region with respect to a digital signal obtained by the imaging sensor, a correction gain for each region is calculated from the exposure setting and the signal value is multiplied by the correction gain. However, when an error from a design value in the exposure time or analog gain occurs due to the imaging sensor, there is a possibility that the exposure may not match between regions and a gradation step may occur on a boundary.

Therefore, an object of the present invention is to provide an image processing device that can appropriately correct an exposure setting error for each region caused by an imaging sensor and is for capturing good images.

SUMMARY OF THE INVENTION

The technique of the present disclosure comprises an acquisition unit configured to acquire an image by setting an exposure condition for each region by an imaging sensor, a derivation unit configured, regarding a boundary between a region of interest and at least one adjacent region adjacent to the region of interest in the image, to derive a correction amount in the region of interest based on pixel values of a boundary pixel group in contact with the boundary included in the region of interest and pixel values of a boundary pixel group in contact with the boundary included in the adjacent region, and a correction unit configured to correct pixel values of pixels in the region of interest based on the derived correction amount.

Further features of the present invention will become apparent from the following description of exemplary embodiments with reference to the attached drawings.

BRIEF DESCRIPTION OF THE DRAWINGS

FIG. 4 is a diagram showing an example of exposure setting for each region of an imaging sensor;

FIG. 5 is a diagram showing reciprocal numbers of proportionality coefficients corresponding to a difference in the exposure setting set for each region of the imaging sensor;

FIG. 6A is a diagram for explaining an exposure setting error;

FIG. 6B is a diagram for explaining the exposure setting error;

DESCRIPTION OF THE EMBODIMENTS

Embodiment 1

Figure 1:
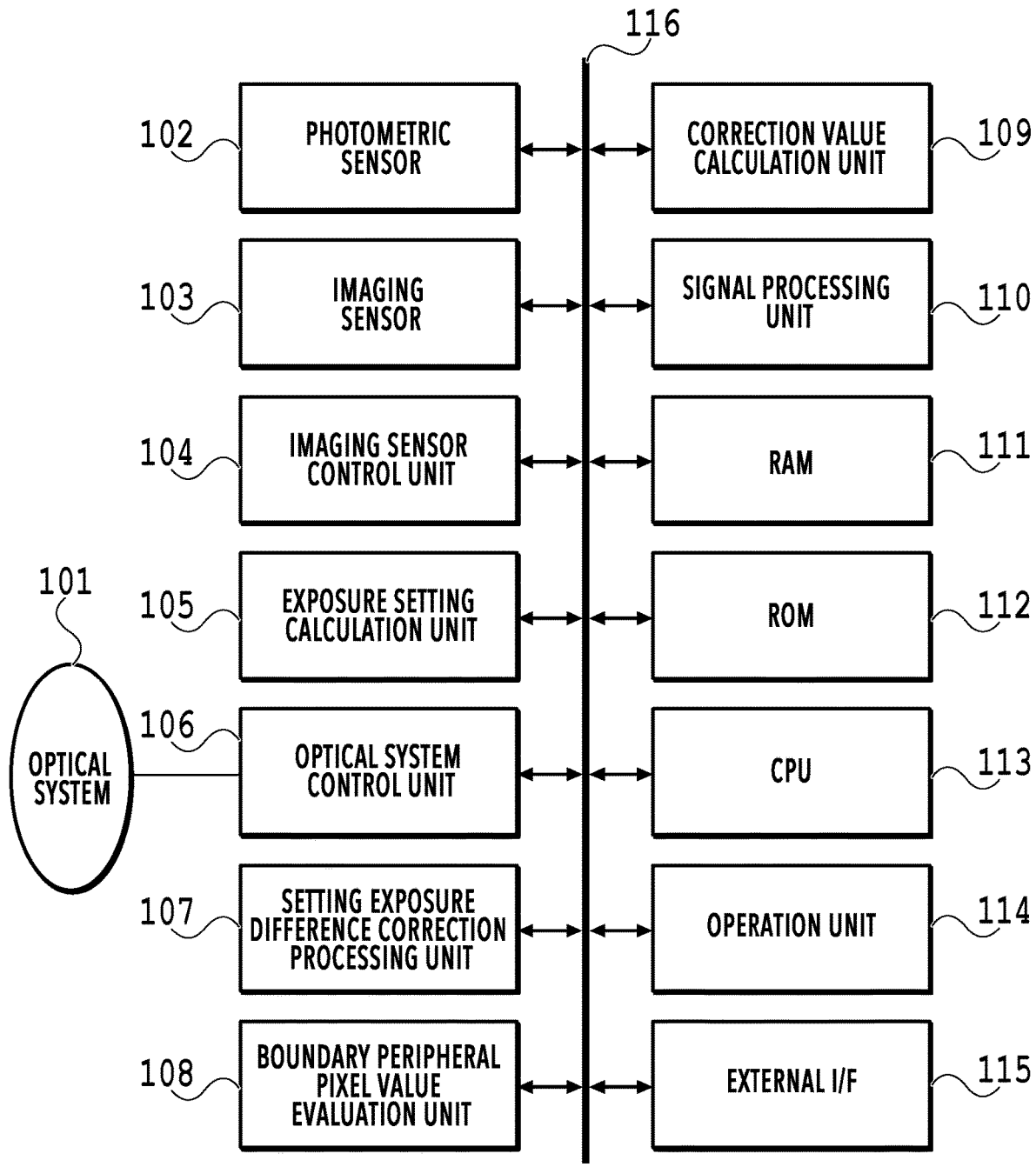
FIG. 1 is a block diagram showing a configuration of an image capturing device according to a first embodiment.

A configuration of an image capturing device according to a first embodiment will be described with reference to FIG. 1. The image capturing device includes an optical system 101, a photometric sensor 102, an imaging sensor 103, an imaging sensor control unit 104, an exposure setting calculation unit 105, an optical system control unit 106, a setting exposure difference correction processing unit 107, a boundary peripheral pixel value evaluation unit 108, a correction value calculation unit 109, and a signal processing unit 110. Also, the image capturing device includes a RAM 111, a ROM 112, a CPU 113, an operation unit 114, an external interface (I/F) 115, and a main bus 116.

The CPU 113 reads out and executes a program recorded in the ROM 112 to execute various operations. A user sets a state of the image capturing device via the operation unit 114 or issues instructions to cause the image capturing device (more specifically, the CPU 113 of the image capturing device) to execute the various operations. Examples of the operations executed by the image capturing device include preliminary exposure and actual image capturing.

When the user points the image capturing device at a subject and operates the operation unit 114 to issue a preliminary exposure instruction, the CPU 113 detects the instruction and starts preliminary exposure as programmed in advance. In the preliminary exposure, the imaging sensor 103 detects light from the subject, focus on the subject is evaluated, and the optical system 101 is driven through the optical system control unit 106 in order to focus. In addition, the photometric sensor 102 senses a light amount of the subject, and basic exposure setting (hereafter simply referred to as basic exposure) of the imaging sensor 103 is determined. Furthermore, the imaging sensor 103 performs preliminary exposure on the basis of the basic exposure. Note that the imaging sensor 103 according to the embodiment is divided into a plurality of two-dimensional regions in advance as described later in order to make a high-dynamic-range imaging possible and is configured to be capable of dynamic exposure setting for each region. Consequently, in the preliminary exposure according to the embodiment, the above determined basic exposure is set for each of the regions. The CPU 113 drives the exposure setting calculation unit 105 to calculate exposure setting for actual image capturing for each region of the imaging sensor 103 from preliminary exposure data (pixel values obtained by the preliminary exposure) recorded in the RAM 111. For example, for a region where pixel values of the preliminary exposure data are saturated, an exposure time is made shorter or a gain is made lower than the basic exposure. On the contrary, for a region where the pixel values of the preliminary exposure data are too small, the exposure time is made longer or the gain is made higher than the basic exposure. In this way, the exposure setting (exposure time and gain) for actual image capturing is calculated for each region. Then, information indicating the calculated exposure setting (hereafter referred to as exposure setting information) is recorded in the RAM 111.

When the user instructs actual image capturing via the operation unit 114, the CPU 113 detects the instruction, and starts an imaging operation. In the actual image capturing, first, the CPU 113 reads in the exposure setting information of each region recorded in the RAM 111 in the preliminary exposure, and passes it to the imaging sensor control unit 104. Then, the imaging sensor control unit 104 controls the imaging sensor 103 to perform exposure on the basis of the received exposure setting information. Thereby, a light amount received by the imaging sensor 103 is converted into a digital signal and the digital signal is input into the setting exposure difference correction processing unit 107. Hereafter, the digital signal may be referred to as image data. The image data is processed (referred to as a setting exposure difference correction process) by the setting exposure difference correction processing unit 107 and, then, once recorded in the RAM 111. Then, the image data subjected to the setting exposure difference correction process is input into the boundary peripheral pixel value evaluation unit 108 and signal processing unit 110. The signal processing unit 110 performs a correction process described later on the received image data. The signal processing unit 110 further performs a development process, such as demosaicing and color correction, and an encoding process, and records the encoded image data in a recording medium connected to the external I/F 115.

Figure 2:
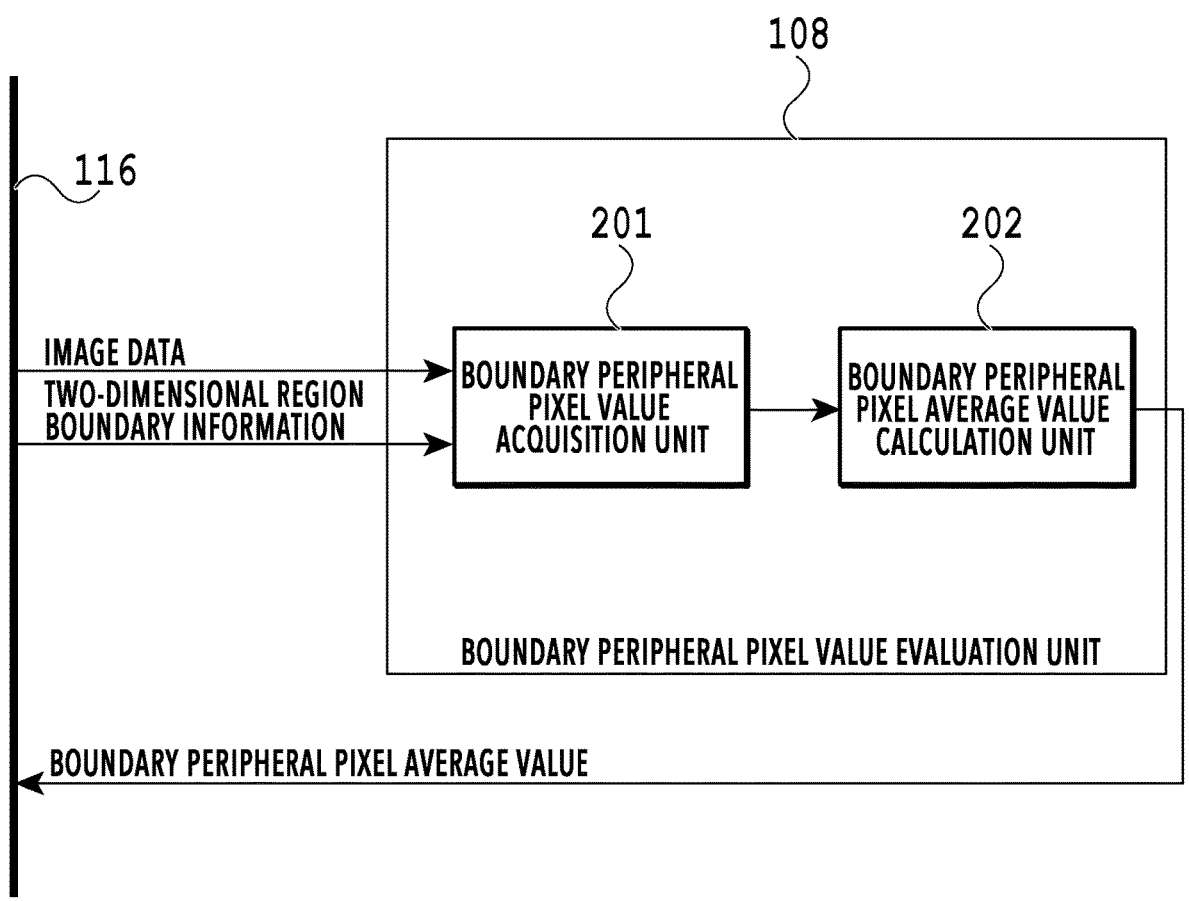
FIG. 2 is a block diagram showing an internal configuration of a boundary peripheral pixel value evaluation unit according to the first embodiment.

FIG. 2 is a block diagram showing an internal configuration of the boundary peripheral pixel value evaluation unit 108 according to the first embodiment. As shown in FIG. 2, the boundary peripheral pixel value evaluation unit 108 includes a boundary peripheral pixel value acquisition unit 201 and a boundary peripheral pixel average value calculation unit 202. The boundary peripheral pixel value acquisition unit 201 acquires pixel values of pixels around a boundary of each region on the basis of the image data subjected to the setting exposure difference correction process and two-dimensional region boundary information (hereafter simply referred to as boundary information) indicating positional information on the boarder. The boundary peripheral pixel average value calculation unit 202 calculates an average value of the pixel values around the boundary of each region (hereafter sometimes referred to as a boundary peripheral pixel average value) and sends the calculated average value to the correction value calculation unit 109. The calculation of the boundary peripheral pixel average value will be described later.

Figure 3:
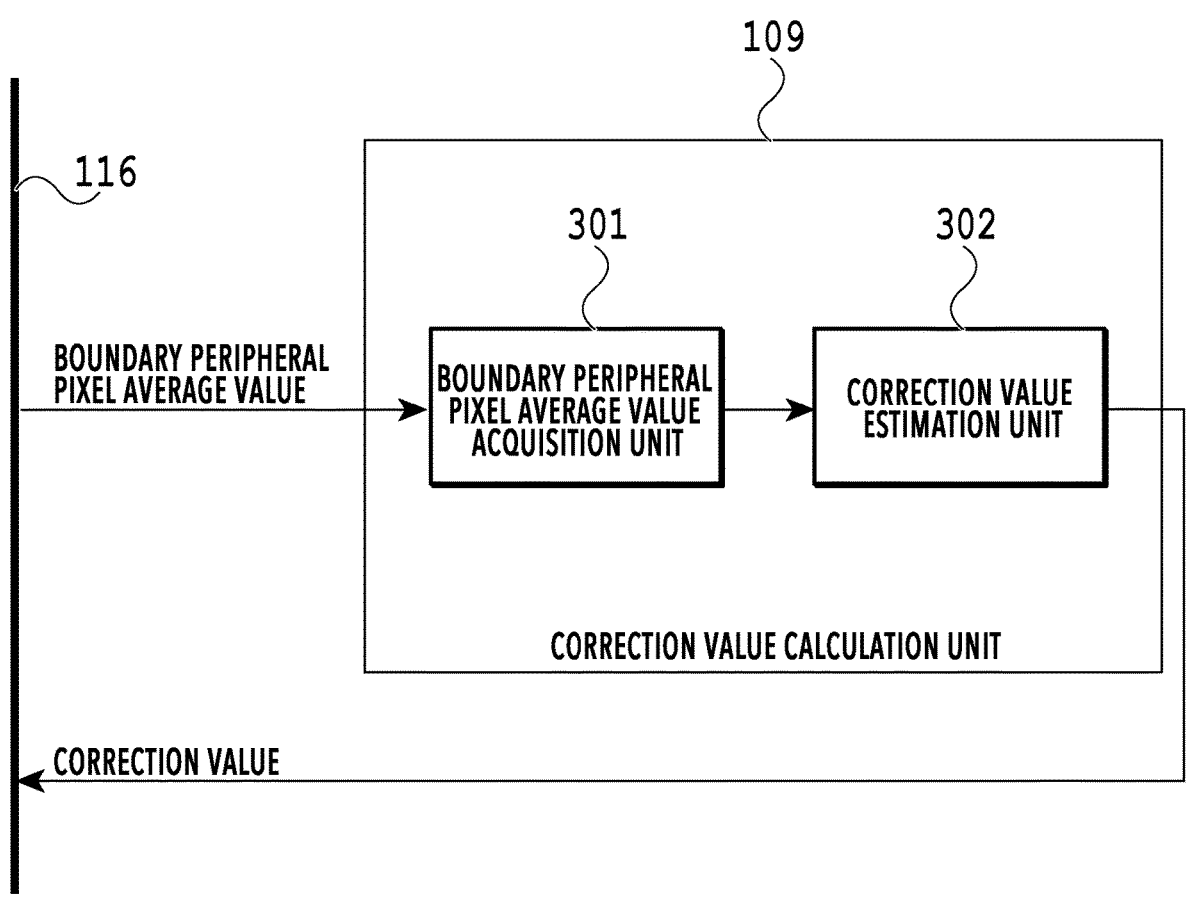
FIG. 3 is a block diagram showing an internal configuration of a correction value calculation unit according to the first embodiment.

FIG. 3 is a block diagram showing an internal configuration of the correction value calculation unit 109 according to the first embodiment. As shown in FIG. 3, the correction value calculation unit 109 includes a boundary peripheral pixel average value acquisition unit 301 and a correction value estimation unit 302. The boundary peripheral pixel average value acquisition unit 301 receives the boundary peripheral pixel average value. The correction value estimation unit 302 estimates (calculates) a correction value for correcting the digital signal (image data subjected to the setting exposure difference correction process) on the basis of the boundary peripheral pixel average value and records it in the RAM 111. The calculation of the correction value in the correction value calculation unit 109 will be described later.

<Exposure Setting for Each Region and Error>

FIG. 4 is a diagram showing an example of exposure setting for each region of the imaging sensor 103. As shown in FIG. 4, the imaging sensor 103 according to the embodiment is divided into eight rectangular regions both vertically and horizontally. An exposure time T and a gain G can be set for each of the division regions. Note that the regional division in the imaging sensor 103 may be other forms. For example, it may be divided into six rectangles vertically and ten rectangles horizontally. The shape of regions may be a shape other than the rectangle. In FIG. 4, a region described as T=1/100 indicates that the exposure time is set to 1/100 second. A region described as T=1/200 indicates that the exposure time is set to 1/200 second. A region described as G=6 dB indicates that an analog gain (which may include a digital gain) that is twice as large as a region described as G=0 dB is set. A pixel value output by the imaging sensor 103 can be expressed by the following Formula 1.

[Expression 1]

$$I(x,y)=B+kS(x,y)T_n \cdot 10^{G_n/20} \qquad \text{(Formula 1)}$$

Here, "x" and "y" denote coordinates indicating a pixel position on the imaging sensor 103. I(x, y) denotes a pixel value (value of the digital signal) at the pixel position (x, y). "B" denotes a black level (average of pixel values in a case of image capturing in light shielded). A lower-case "k" denotes a constant of proportionality. S(x, y) denotes illuminance of an image of the subject formed by the optical system 101 at the position (x, y) on the imaging sensor 103. "Tn" denotes an exposure time of an nth region and "Gn" denotes a gain of the nth region. If S(x, y) is the same at certain two points, comparing a region n set to Tn=1/100 and Gn=0 dB with a region m set to Tm=1/200 and Gm=0 dB, the region m will have a pixel value twice as large as that of the region n when the black level is excluded. Therefore, in order to obtain a signal O(x, y) having linearity with respect to S(x, y) in the entire image when there is no error in the exposure time Tn and gain Gn, setting exposure difference correction process represented by the following formula is performed on the pixel value I(x, y) obtained by image capturing.

[Expression 2]

$$O(x,y)=q[I(x,y)-B]\cdot(1/T_n)10^{G_n/20}+B_1 \quad \text{(Formula 2)}$$

Here, "q" denotes a constant, and $B_1$ denotes an arbitrary black level. Formula 2 is a process of multiplying a reciprocal number of a coefficient of proportionality so as to cancel out the coefficient of proportionality $T_n10^\wedge$ ($G_n/20$) due to difference of the exposure setting. FIG. 5 shows an example of reciprocal numbers corresponding to the respective regions. By substituting Formula 1 into Formula 2, the following Formula 3 is obtained.

[Expression 3]

$$O(x,y)=qkS(x,y)+B_1 \quad \text{(Formula 3)}$$

In Formula 3, O(x, y) and S(x, y) have a linear relationship regardless of the region. At this time, the constant q is determined so that a range of the pixel value of O(x, y) is appropriate.

However, there are cases when errors $\Delta T_n$ and $\Delta G_n$ have occurred to $T_n$ and $G_n$ due to the imaging sensor 103, respectively. In other words, for the exposure setting $T_n$ and $G_n$, which are target values, there are cases when a time when the sensor is actually exposed or an amplification gain becomes $T_n+\Delta T_n$ or $G_n+\Delta G_1$, respectively. In such a case, even if the same process is performed, a linear relationship is not established as indicated in the following Formula 4. Hereafter, when referred to as "actual exposure" or simply "exposure," it refers to $T_n+\Delta T_n$ or $G_n+\Delta G_n$.

[Expression 4]

$$O(x,y)=qkS(x,y)(1+\Delta T_n/T_n)\cdot 10^{\Delta G_n/20}+B_1 \quad \text{(Formula 4)}$$

When also in the black level B, there is an error $\Delta B_n$ for each region, an error further occurs as indicated in Formula 5.

[Expression 5]

$$O(x,y)=qkS(x,y)(1+\Delta T_n/T_n)\cdot 10^{\Delta G_n/20}+q\Delta B_n(1/T_n)\cdot 10^{-G_n/20}++B_1 \quad \text{(Formula 5)}$$

Here, Formula 5 is simplified as

[Expression 6]

$$\Delta F_n=1/[(1+\Delta T/T_n)\cdot 10^{\Delta G_n/20}]$$

$$\Delta O_n=-q\Delta B(1/T_n)10^{-G_n/20}$$

then the following Formula 6 is obtained.

[Expression 7]

$$O(x,y)=qkS(x,y)/\Delta F_n+B_1-\Delta O_n \quad \text{(Formula 6)}$$

As shown in Formula 6, errors can be classified into a gain error $\Delta F_n$ and an offset error $\Delta O_n$. The signal processing unit 110 according to the embodiment corrects these errors in the correction process described later. FIG. 6A shows an example of an error of the gain G at each region. FIG. 6B shows an example of the gain error occurring to the signal O(x, y) by the error of the gain G shown in FIG. 6A. In FIG. 6B, values such as "x1," "x1.014," and "x0.986" show degrees of the gain error of the signal O (x, y) at each region, and "x1" indicates that the gain error has not occurred.

<Principle of Correction Process>

Figure 7:
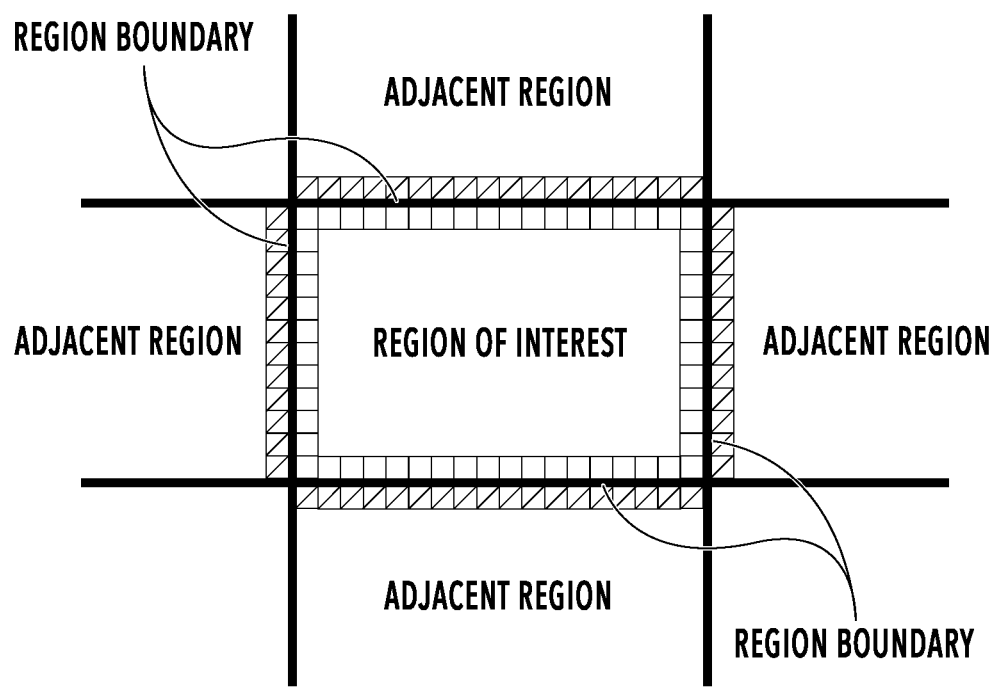
FIG. 7 is a diagram for explaining a region and a boundary of the region.

When the error $\Delta F_n$ and error $\Delta O_n$ exist, a step of pixel values (gradation) (hereafter referred to as a false step) that originally does not exist on the subject occurs on a boundary between regions (hereafter referred to as a region boundary). In the embodiment, the error $\Delta F_n$ and error $\Delta O_n$ are estimated for each region so as to eliminate such a step of pixel values, and the digital signal (image data subjected to the setting exposure difference correction process) is corrected. As shown in FIG. 7, when the shape of the regions is rectangular, a region of interest has four adjacent regions and there are four region boundaries that may cause false steps. The false steps differ for the four respective region boundaries, and after the correction process, these false steps must be eliminated at the same time. Furthermore, the false steps also depend on errors $\Delta F_m$ and $\Delta O_m$ of the adjacent regions, and the errors of the adjacent regions affect false steps of regions further adjacent to the adjacent regions. Therefore, in the embodiment, the errors $\Delta F_n$ and $\Delta O_n$ of all the regions are estimated so as to eliminate false steps occurring on all the region boundaries existing on the entire image. On the basis of the estimated errors, the correction process is performed so as to cancel out the errors. Note that, in FIG. 7, white squares represent pixels on the region of interest side among pixels of the region boundary, whereas hatched white squares represent pixels that are not on the region of interest side among the pixels of the region boundary.

<Calculation of Boundary Peripheral Pixel Average Value>

Figure 8:
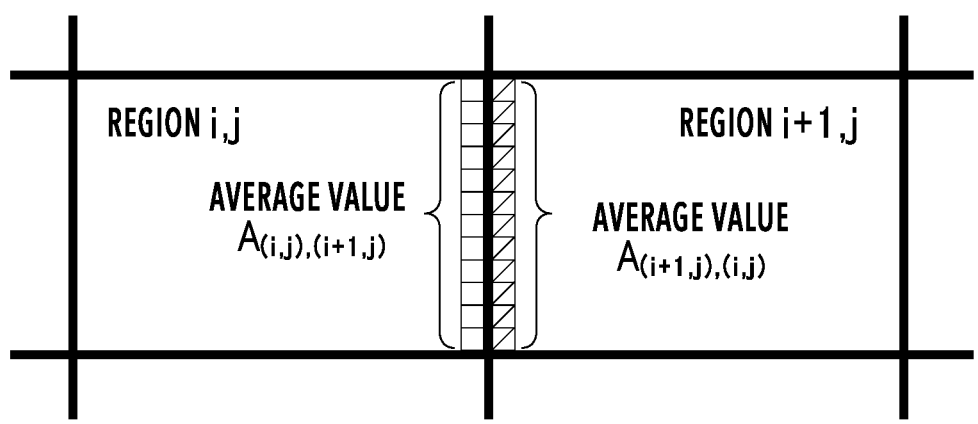
FIG. 8 is a diagram showing pixels used when calculating an average value of pixel values around a boundary of a region.

In order to implement the correction process of cancelling out the errors, in the embodiment, the boundary peripheral pixel value evaluation unit 108 calculates the above-described boundary peripheral pixel average value. Here, in FIG. 7, a region that is an i-th from the left and a j-th from top counted from the upper left of the image is denoted by a region i, j. An average value of pixels on the region of interest side on the boundary between a region i, j which is the region of interest and a region i+1, j adjacent to the right side of the region of interest is denoted by $A_{(i,j),\ (i+1,j)}$. An average value of pixels that are not on the region of interest side on the boundary is denoted by $A_{(i+1,j),\ (i,j)}$. FIG. 8 is a diagram showing pixels used when calculating the boundary peripheral pixel average value. As shown in FIG. 8, in the embodiment, the boundary peripheral pixel average value is calculated using pixels of one-pixel width adjacent to each region boundary. When calculating the boundary peripheral pixel average value, it is preferable to calculate by detecting and omitting a defective pixel and omitting a saturated pixel. In this way, by excluding the defective pixel and saturated pixel from a calculation object of the boundary peripheral pixel average value, it becomes possible to obtain a more accurate boundary peripheral pixel average value.

<Correction Value Calculation Process>

Next, a process of calculating a correction value from the boundary peripheral pixel average value will be described. In the correction value calculation process (also referred to as a correction value derivation process), first, an evaluation value derivation process of deriving an evaluation value from the boundary peripheral pixel average value is performed as described below. Here, it is assumed that a gain error and an offset error of the region i, j are $\Delta F_{i,j}$ and $\Delta O_{i,j}$, respectively. Then, an evaluation value $E_{i,j}$ of steps between the region i, j after error correction and regions adjacent to the right side and the lower side of the region i, j is defined by the following Formula 7.

[Expression 8]

$$E_{i,j}=(\Delta F_{i,j}[A_{(i,j),(i+1,j)}+O_{i,j}]-\Delta F_{i+1,j}[A_{(i+1,j),(i,j)}+\Delta O_{i+1,j}])^2+(\Delta F_{i,j}[A_{(i,j),(i,j+1)}+\Delta O_{i,j}]-\Delta F_{i,j+1}[A_{(i,j+1),(i,j)}+\Delta O_{i,j+1}])^2 \quad \text{(Formula 7)}$$

A first term on the right side of Formula 7 is a term corresponding to a step with the region adjacent to the right side. A second term is a term corresponding to a step with the region adjacent to the lower side. Note that, when the region is located at an end of the image and if there is no region adjacent to the right or below of the region, the corresponding term is set to zero. The correction value estimation unit 302 of the correction value calculation unit 109 adds the evaluation value $E_{i,j}$ for all the regions to derive an overall evaluation value E. The overall evaluation value E is represented by the following Formula 8.

[Expression 9]

$$E = \sum_i \sum_j E_{i,j} \quad \text{(Formula 8)}$$

Then, the correction value estimation unit 302 of the correction value calculation unit 109 determines (estimates) $\Delta F_{i,j}$ and $\Delta O_{i,j}$ so that the derived overall evaluation value E is minimized. Note that regarding the imaging sensor 103 whose offset error $\Delta O_{i,j}$ can be ignored, the minimization of the overall evaluation value E is a simultaneous linear equation for the error $\Delta F_{i,j}$ having a quadratic expression of an average value A as a coefficient. Therefore, by solving the simultaneous linear equation, it is possible to estimate $\Delta F_{i,j}$. If the offset error $\Delta O_{i,j}$ cannot be ignored, $\Delta F_{i,j}$ and $\Delta O_{i,j}$ may be estimated by convergence calculation. $\Delta F_{i,j}$ and $\Delta O_{i,j}$ may be alternately fixed and calculated until convergence, for example, in such a way as, first, $\Delta O_{i,j}$ is assumed 0 to obtain $\Delta F_{i,j}$, then $\Delta F_{i,j}$ is fixed to obtain $\Delta O_{i,j}$, then $\Delta O_{i,j}$ is fixed to obtain $\Delta F_{i,j}$, and so on. Thereby, $\Delta F_{i,j}$ and $\Delta O_{i,j}$ can be estimated. Alternatively, $\Delta F_{i,j}$ and $\Delta O_{i,j}$ that minimize the overall estimation value E may be estimated in the same manner as a general minimization problem. In the embodiment, the correction process described later is performed using $\Delta F_{i,j}$ and $\Delta O_{i,j}$ obtained in this way as correction values.

<Detail of Correction Process>

By using the correction values $\Delta F_{i,j}$ and $\Delta O_{i,j}$ obtained in the correction value calculation process, the signal processing unit 110 applies the following correction process to the signal O(x, y) generated according to Formula 2 to generate a correction image C(x, y).

[Expression 10]

$$C(x,y)=(O(x,y)+\Delta O_{i,j}-B_1)\Delta F_{i,j}+B_2 \quad \text{(Formula 9)}$$

Here, B2 denotes an arbitrary black level and has the same value for the entire image. At this time, the region i, j needs to correspond to the pixel coordinates (x, y). That is, the region i, j needs to be a region to which the pixel coordinates (x, y) belong.

When the imaging sensor 103 includes a Bayer array color filter, or the like, and a digital signal corresponding to a plurality of colors (for example, red, green 1, green 2, and blue) is obtained, those processes need to be performed for each color.

In the embodiment, the correction value is calculated after performing the setting exposure difference correction process on the digital signal obtained from the imaging sensor 103. However, it is difficult to distinguish the gain error $\Delta F_{i,j}$ and a gain difference due to an exposure setting difference. For example, when an actual gain in a certain region is 2.2 times, it is difficult to distinguish whether an error of 1.1 times has occurred with respect to a gain setting of two times, causing 2.2 times or whether an error of 2.2 times has occurred with respect to a gain setting of one time (that is, setting of no gain). For this reason, the digital signal received from the imaging sensor 103 may be directly input into the boundary peripheral pixel value evaluation unit 108 without performing the setting exposure difference correction process. Thereby, although the accuracy is somewhat reduced, this makes it possible to calculate a correction value that takes into account the gain for the setting exposure difference correction and the gain error at the same time. Since performing the setting exposure difference correction process becomes unnecessary, the setting exposure difference correction processing unit 107 can be omitted. That is, in the embodiment, the setting exposure difference correction processing unit 107 is not an essential component.

<Processing Flow of Image Capturing Device>

Figure 9:
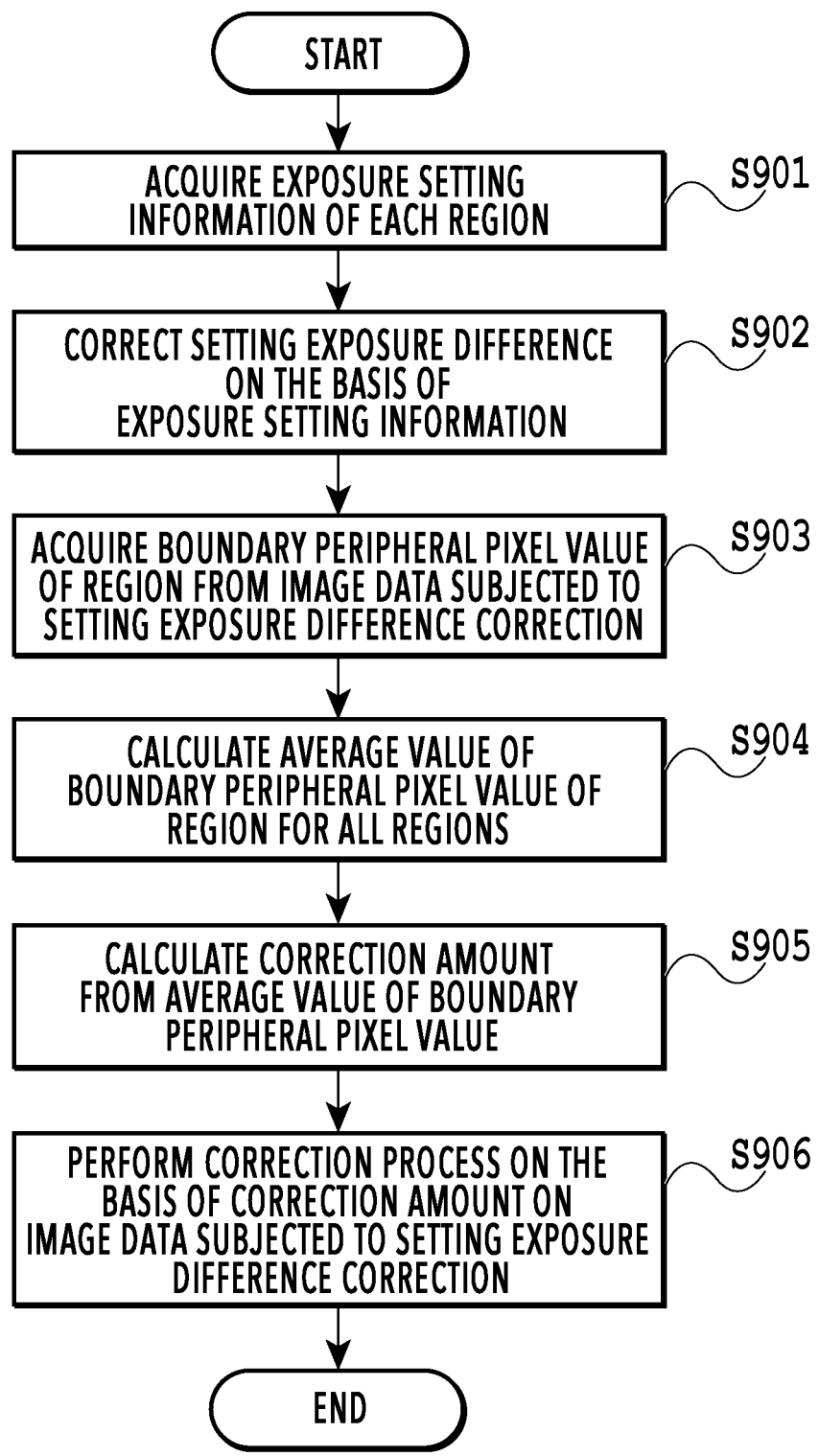
FIG. 9 is a flowchart illustrating operation of the image capturing device according to the first embodiment.

FIG. 9 is a flowchart illustrating operation of the image capturing device according to the first embodiment. FIG. 9 illustrates an operation of the image capturing device after executing the actual image capturing.

First, the setting exposure difference correction processing unit 107 acquires the exposure setting information of each region (S901). Next, the setting exposure difference correction processing unit 107 performs the setting exposure difference correction process on the digital signal input from the imaging sensor 103 on the basis of the exposure setting information (S902). At this time point, the digital signal (image data subjected to the setting exposure difference correction process) has an error and a step occurs on the region boundary.

Next, the boundary peripheral pixel value evaluation unit 108 obtains the boundary information of each region and obtains pixel values of peripheral pixels of the region boundary for the image data subjected to the setting exposure difference correction process on the basis of the boundary information (S903). Then, the boundary peripheral pixel value evaluation unit 108 calculates an average value of the pixel values of the peripheral pixels of the region boundary (S904). Next, the correction value calculation unit 109 calculates a correction value on the basis of the average value calculated in S904 (S905). Finally, the signal processing unit 110 performs a correction process on the image data subjected to the setting exposure difference correction process on the basis of the correction value calculated in S905 (S906). Thereafter, the signal processing unit 110 performs the development process, encoding process, and the like, on the image data subjected to the correction process.

As described above, in the embodiment, the evaluation value is obtained using the average value of the peripheral pixels of the region boundary, and the image data is corrected using the correction value calculated from the evaluation value. Therefore, according to the embodiment, even if an error occurs in the exposure setting of each region due to the imaging sensor, it is possible to make it difficult to cause a step of gradation on the region boundary and to generate a good image.

In order to avoid an influence of noise, the average values of the region boundary $A_{(i,j),(i+1,j)}$ and $A_{(i+1,j),(i,j)}$ need to be obtained from a plurality of pixels. Therefore, it is desirable that the shape of the region is a two-dimensionally spread shape in which a plurality of pixels are disposed in two directions, for example, a vertical direction (up and down direction in FIG. 7) and a horizontal direction (left and right direction in FIG. 7). In addition, when the imaging sensor 103 includes a Bayer array color filter or the like and a digital signal corresponding to a plurality of colors is obtained and when a signal process is performed for each color, it is desirable that the region of each color (pixels corresponding to each color) has a two-dimensionally spread shape.

Embodiment 2

The first embodiment has been described using the image capturing device that calculates the errors $\Delta F_n$ and $\Delta O_n$ so as to eliminate the step on the region boundary as an example. In the second embodiment, an image capturing device that performs more accurate correction in consideration of a gradient of pixel values originally existing on a subject in an image will be described.

A configuration of an image capturing device of the second embodiment is the same as that of the first embodiment. However, internal configurations of a boundary peripheral pixel value evaluation unit 108 and a correction value calculation unit 109 are different. Hereinafter, differences from the first embodiment will be described.

Figure 10:
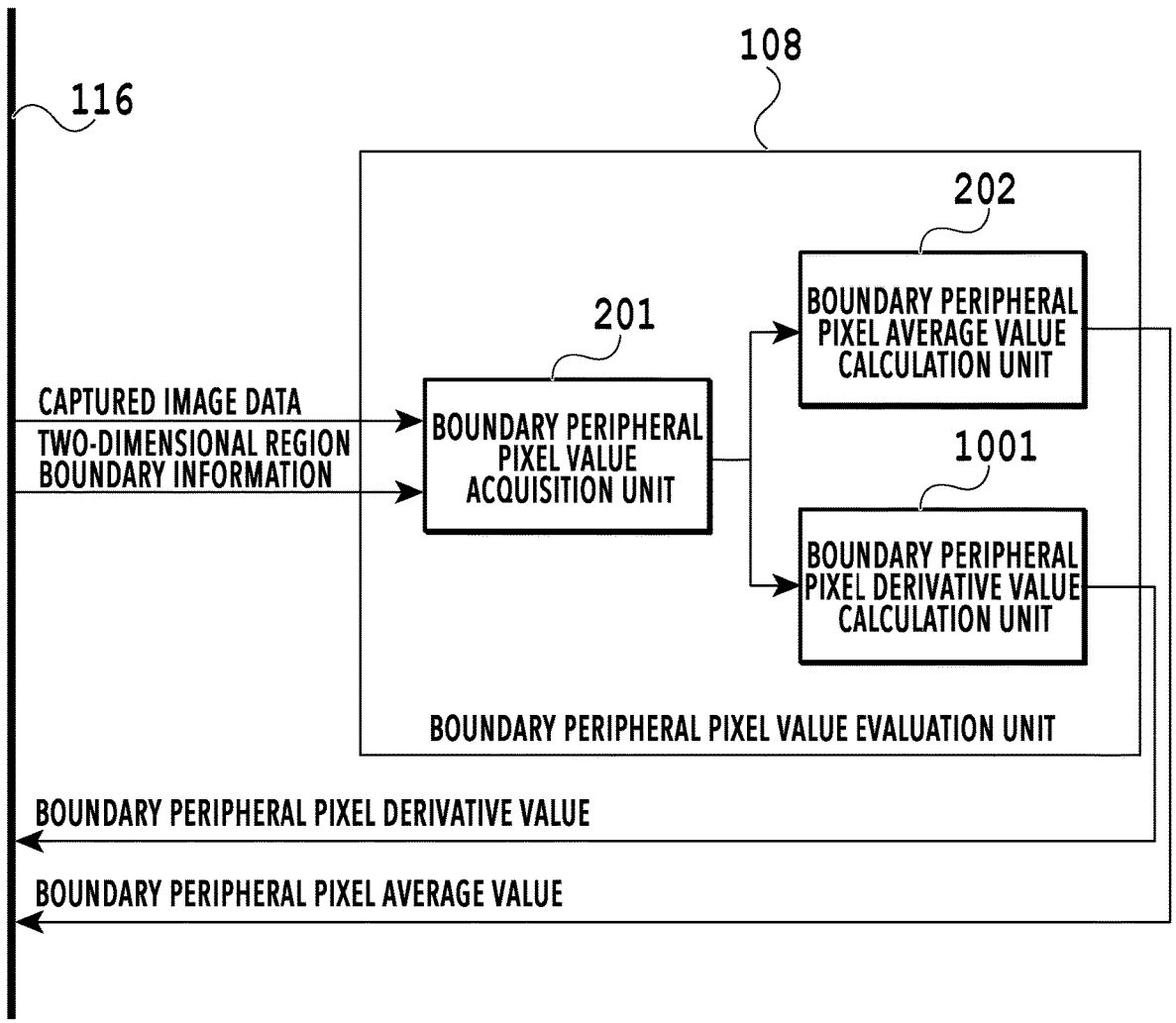
FIG. 10 is a block diagram showing an internal configuration of a boundary peripheral pixel value evaluation unit according to a second embodiment.
Figure 11:
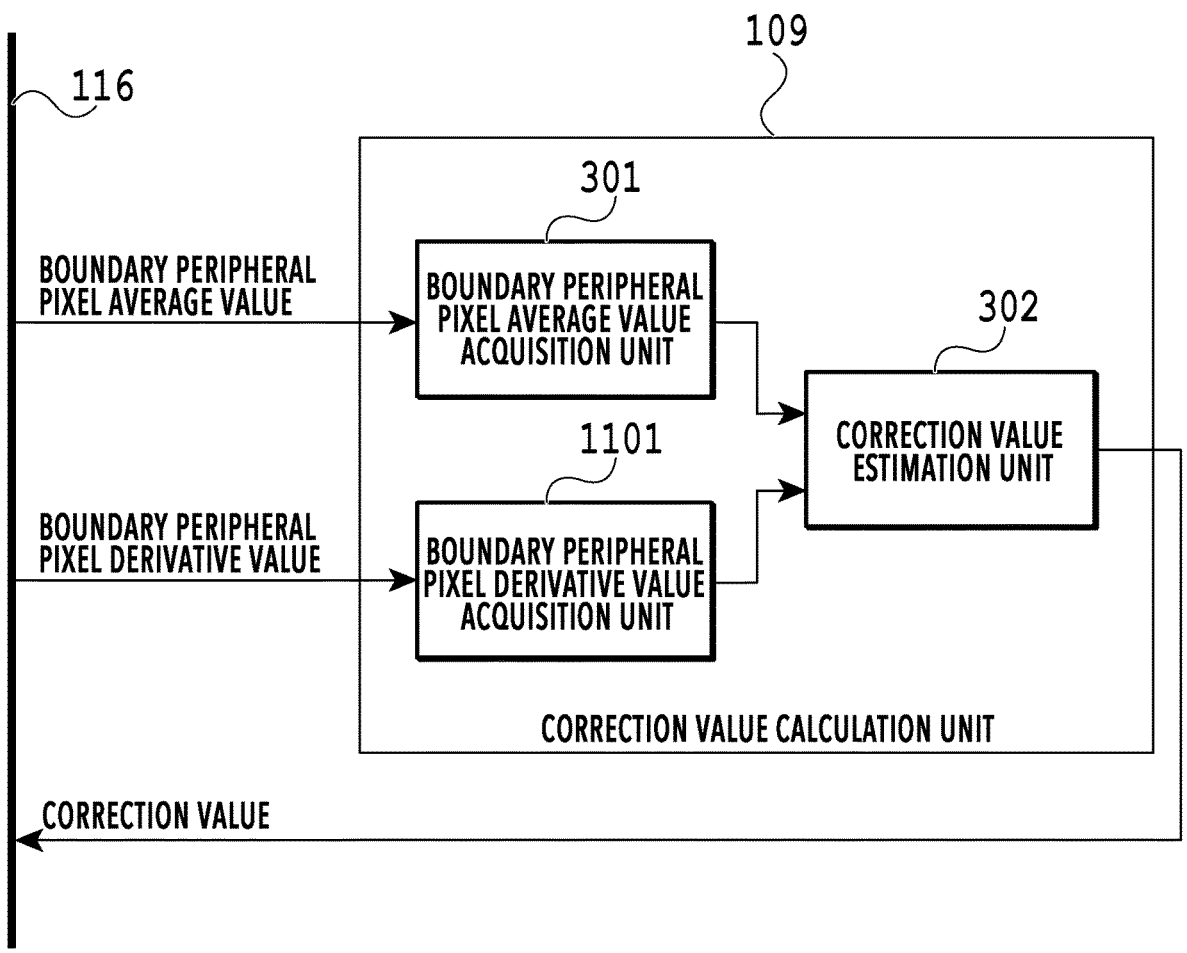
FIG. 11 is a block diagram showing an internal configuration of a correction value calculation unit according to the second embodiment.

FIG. 10 is a block diagram showing the internal configuration of the boundary peripheral pixel value evaluation unit 108 according to the second embodiment. FIG. 11 is a block diagram showing the internal configuration of the correction value calculation unit 109 according to the second embodiment. In the first embodiment, the evaluation value is obtained using the average value of the pixel values of the peripheral pixels of the region boundary, and the correction value is calculated on the basis of the evaluation value. In the present embodiment, the evaluation value is obtained using not only an average value of pixel values of peripheral pixels of a region boundary but also a derivative value. Consequently, as shown in FIG. 10, the boundary peripheral pixel value evaluation unit 108 of the embodiment includes a boundary peripheral pixel derivative value calculation unit 1001 in addition to the components of the first embodiment. Furthermore, as shown in FIG. 11, the correction value calculation unit 109 of the embodiment includes a boundary peripheral pixel derivative value acquisition unit 1101 in addition to the components of the first embodiment.

The boundary peripheral pixel derivative value calculation unit 1001 calculates a derivative value of pixel values of peripheral pixels of the region boundary (hereafter sometimes referred to as a boundary peripheral pixel derivative value). The boundary peripheral pixel derivative value acquisition unit 1101 acquires the boundary peripheral pixel derivative value calculated by the boundary peripheral pixel derivative value calculation unit 1001 and passes it to a correction value estimation unit 302. The correction value estimation unit 302 estimates (calculates) a correction value from a boundary peripheral pixel average value received from a boundary peripheral pixel average value acquisition unit 301 and the boundary peripheral pixel derivative value received from the boundary peripheral pixel derivative value acquisition unit 1101.

Figure 12:
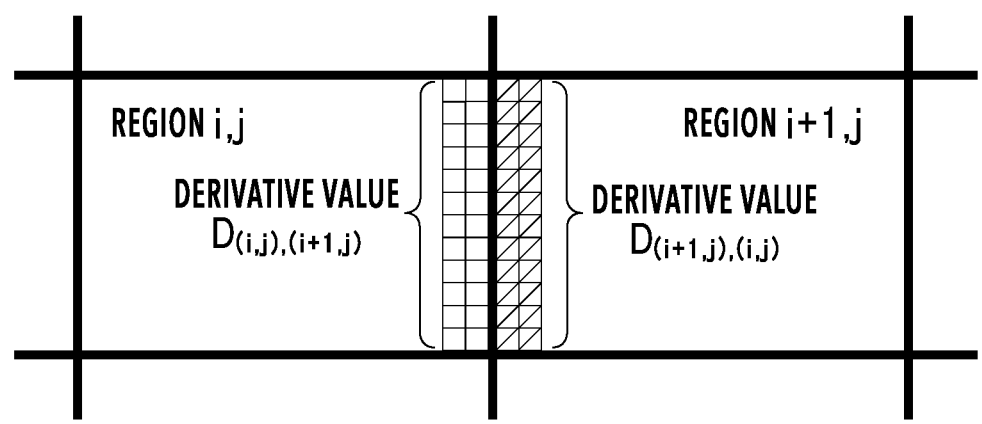
FIG. 12 is a diagram showing pixels used when calculating the average value and a derivative value of the pixel values around the boundary of the region.

FIG. 12 is a diagram showing pixels used when calculating the boundary peripheral pixel average value and the boundary peripheral pixel derivative value. As shown in FIG. 12, a boundary peripheral pixel value acquisition unit 201 of the boundary peripheral pixel value evaluation unit 108 of the embodiment acquires pixel values of pixels of two-pixel width as pixel values of the peripheral pixels of the region boundary. Then, the boundary peripheral pixel derivative value calculation unit 1001 of the boundary peripheral pixel value evaluation unit 108 calculates derivative values $D_{(i,j),(i+1,j)}$ and $D_{(i,j),(i,j+1)}$ from pixel values of the pixels in a range of two-pixel width. In this way, in the embodiment, not only the average value of the pixel values of the peripheral pixels of the region boundary but also the derivative value is calculated. The reason for calculating the derivative value is to make the boundary region have a similar gradient to the derivative value. Note that the average value may be obtained from the pixel values of the pixels within the range of one-pixel width as in the first embodiment. Furthermore, when calculating the boundary peripheral pixel derivative value, it is preferable that the calculation is performed omitting a defective pixel and a saturated pixel as in when calculating the boundary peripheral pixel average value.

According to the above concept, an evaluation value $E_{i,j}$ corresponding to Formula 6 can be expressed as the following formula.

[Expression 11]

$$E_{i,j}=(\Delta F_{i,j}[A_{(i,j),(i+1,j)}+\Delta O_{i,j}]-\Delta F_{i+1,j}[A_{(i+1,j),(i,j)}+\Delta O_{i+1,j}]+(D_{(i,j),(i+1,j)}+D_{(i+1,j),(i,j)})/2)^2+(\Delta F_{i,j}[A_{(i,j),(i,j+1)}+\Delta O_{i,j}]-\Delta F_{i,j+1}[A_{(i,j+1),(i,j)}+\Delta O_{i,j+1}]+(D_{(i,j),(i,j+1)}+D_{(i,j+1),(i,j)})/2)^2 \quad \text{(Formula 10)}$$

An overall evaluation value E according to the embodiment is obtained by substituting Formula 10 into Formula 8. That is, a value obtained by adding $E_{i,j}$ obtained by Formula 10 for all the regions becomes the overall evaluation value E according to the embodiment. Then, the correction value in the embodiment is obtained by calculating $\Delta F_{i,j}$ and $\Delta O_{i,j}$ that minimize the overall evaluation value E obtained in this way. As in the first embodiment, regarding an imaging sensor 103 whose error $\Delta O_{i,j}$ can be regarded as zero, the minimization of the overall evaluation value E is a simultaneous linear equation for the error $\Delta F_{i,j}$ having values obtained by an average value A and the derivative value D as coefficients. Consequently, in that case, the error $\Delta F_{i,j}$ can be estimated by solving the equation. In the same manner, even when $\Delta O_{i,j}$ cannot be regarded as zero, $\Delta F_{i,j}$ and $\Delta O_{i,j}$ can be calculated by convergence calculation described in the first embodiment.

<Processing Flow of Image Capturing Device>

Figure 13:
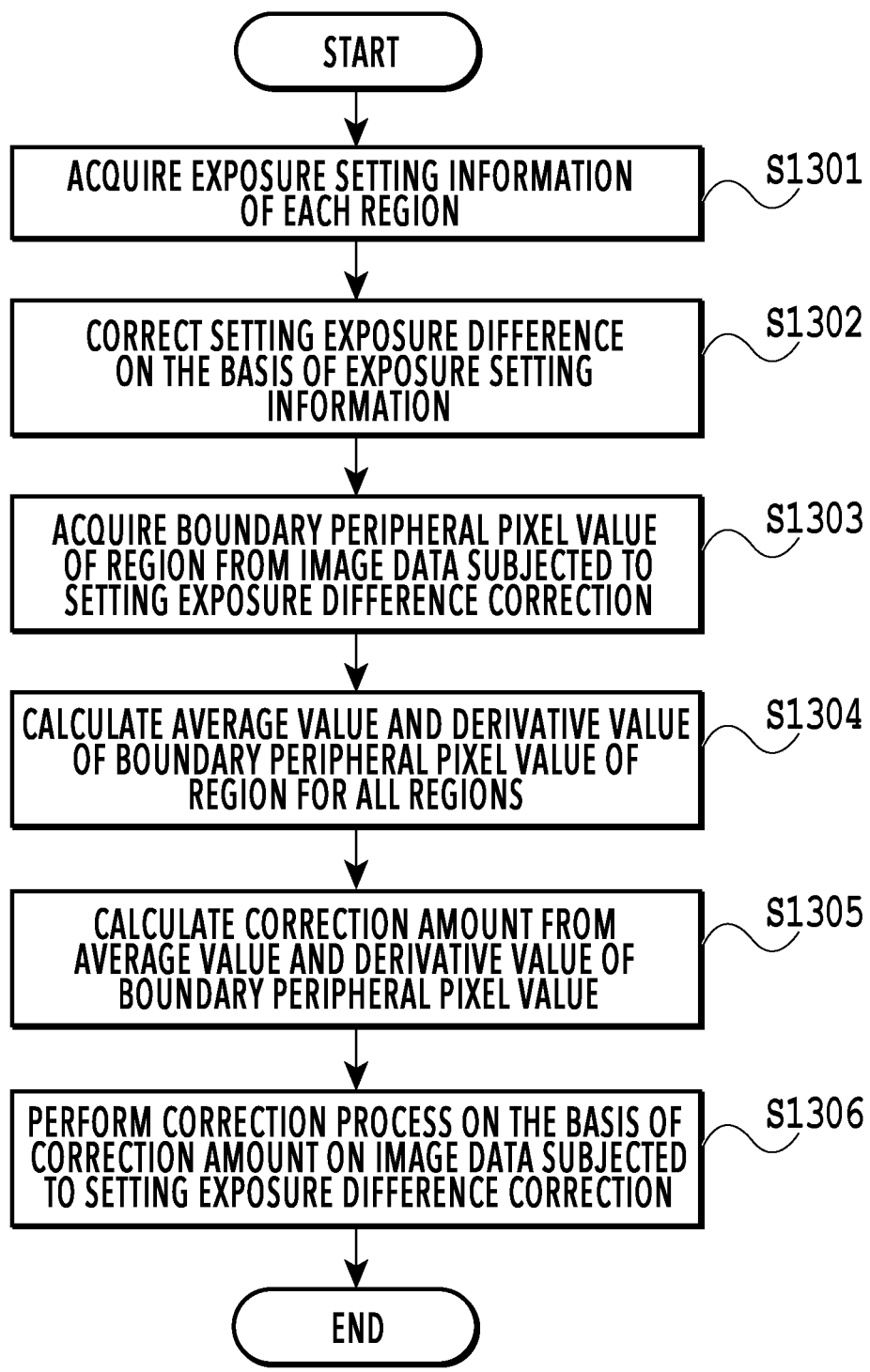
FIG. 13 is a flowchart illustrating operation of an image capturing device according to the second embodiment.

FIG. 13 is a flowchart illustrating operation of the image capturing device according to the second embodiment. FIG. 13 illustrates an operation of the image capturing device after executing the actual image capturing as in FIG. 9. Note that processes at S1301 and S1302 are the same as the processes at S901 and S902 and a description thereof will be omitted.

After S1302, the boundary peripheral pixel value evaluation unit 108 performs a process of acquiring boundary information of each region (boundary information acquisition process). Then, the boundary peripheral pixel value evaluation unit 108 performs a process of acquiring pixel values of peripheral pixels of the region boundary on the image data subjected to the setting exposure difference correction process on the basis of the acquired boundary information (S1303). At this time, the boundary peripheral pixel value evaluation unit 108 acquires pixel values of the pixels in the range of two-pixel width as the pixel value of the peripheral pixels of the region boundary as described above. Then, the boundary peripheral pixel value evaluation unit 108 calculates an average value and a derivative value of the pixel values of the peripheral pixels of the region boundary (S1304). Then, the correction value calculation unit 109 calculates a correction value on the basis of the average value and derivative value calculated in S1304 (S1305). Finally, the signal processing unit 110 performs the correction process on the image data subjected to the setting exposure difference correction process on the basis of the correction value calculated in S1305 (S1306). Then, the signal processing unit 110 performs a development process, an encoding process, and the like on the image data subjected to the correction process.

As described above, in the embodiment, the evaluation value is obtained by using not only the average value of the pixel values of the peripheral pixels of the region boundary but also the derivative value, and the correction value is calculated on the basis of the evaluation value. Thereby, it becomes possible to perform more accurate correction in consideration of the gradient of pixel values originally existing on the subject image. Therefore, for example, even when gradation on the subject image exists over the region boundary, the gradation can be reproduced more faithfully.

Embodiment 3

Errors $\Delta$Tn and $\Delta$Gn from setting values of exposure due to an imaging sensor 103 do not take any values. For example, when an error that cannot be made in the imaging sensor 103 in the first place, such that actual exposure Tn+$\Delta$Tn is estimated as $\frac{1}{200}$ for exposure setting Tn=$\frac{1}{100}$, is estimated, the estimation result needs to be confined in a certain range (range of values that can be taken as the errors $\Delta$Tn and $\Delta$Gn). The reason is that if such an estimation result is used as is for calculating the correction value, there is a possibility that an appropriate correction value may not be obtained. Therefore, in the present embodiment, an image capturing device that uses such a range as prior information and performs more accurate correction will be described.

A configuration of an image capturing device of a third embodiment is the same as that of the second embodiment. However, an internal configuration of a correction value calculation unit 109 is different. Hereafter, differences from the second embodiment will be described.

Figure 14:
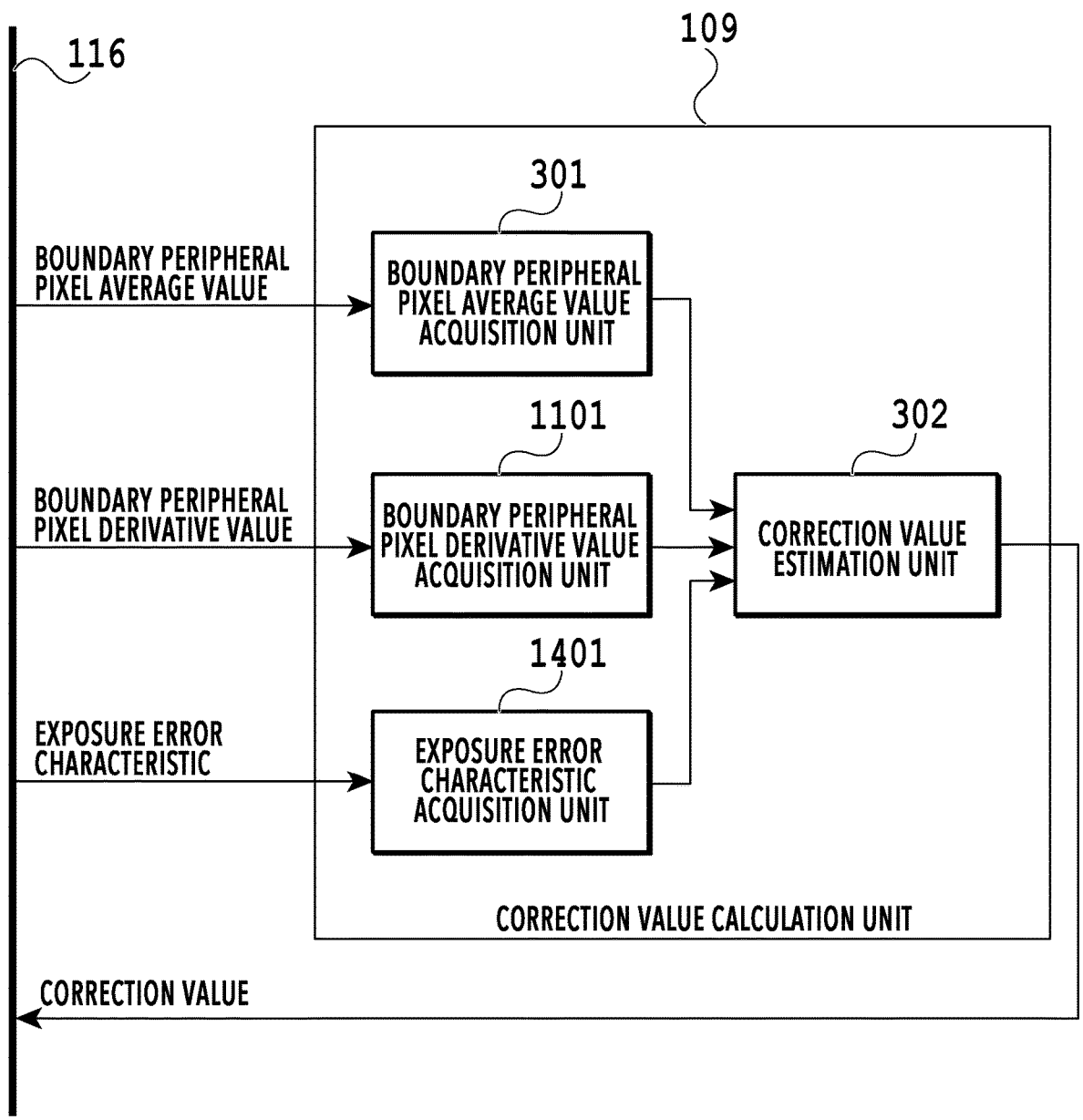
FIG. 14 is a block diagram showing an internal configuration of a correction value calculation unit according to the second embodiment.

FIG. 14 is a block diagram showing the internal configuration of the correction value calculation unit 109 according to the third embodiment. The correction value calculation unit 109 in the embodiment includes an exposure error characteristic acquisition unit 1401 in addition to the components of the second embodiment. In the embodiment, exposure error characteristic information obtained by measurement in advance and indicating a range of an exposure setting error is recorded in a ROM 112, and the exposure error characteristic acquisition unit 1401 reads out the exposure error characteristic information from the ROM 112. A correction value estimation unit 302 uses the exposure error characteristic information received from the exposure error characteristic acquisition unit 1401 to estimate an error $\Delta F_{i,j}$ and an error $\Delta O_{i,j}$. Specifically, the correction value estimation unit 302 determines whether estimation results of the error $\Delta F_{i,j}$ and error $\Delta O_{i,j}$ exceed the range of the exposure setting error indicated by the exposure error characteristic information. Then, if $\Delta F_{i,j}$ and $\Delta O_{i,j}$ exceed the range of the exposure setting error indicated by the exposure error characteristic information, the correction value estimation unit 302 changes those values so that those values fall within the range of the exposure setting error.

Alternatively, as a method of performing more accurate correction, there is a method of estimating the error $\Delta F_{i,j}$ and error $\Delta O_{i,j}$ after adding the following regularization term R to the evaluation value $E_{i,j}$ indicated in Formula 10.

$$R = Z[(\Delta F_{i,j})^2/\sigma_F^2 + (\Delta O_{i,j})^2/\sigma_O^2]$$   [Expression 12]

Here, $\sigma_F$ and $\sigma_O$ denote standard variations of the error $\Delta F_{i,j}$ and error $\Delta O_{i,j}$, respectively, and are measured in advance and recorded in the ROM 112. Z denotes a parameter that determines strength of an effect of the regularization term R and is determined in advance and recorded in the ROM 112. The regularization term R sharply increases when the error $\Delta F_{i,j}$ and error $\Delta O_{i,j}$ exceed the respective standard variations. Therefore, by minimizing the overall evaluation value E to which the regularization term R is added, it is possible to avoid such a large estimation result from being derived and accurately calculate the error $\Delta F_{i,j}$ and error $\Delta O_{i,j}$. In this way, by the method using the regularization term R, it is possible to confine the error $\Delta F_{i,j}$ and error $\Delta O_{i,j}$ in the predetermined range.

The minimization of the overall evaluation value E may be performed in the same manner as in the first embodiment and second embodiment. Since the characteristic of the exposure setting error is utilized in the embodiment, it is desirable that a setting exposure difference correction processing unit 107 is not omitted and made an essential component. Although an example of using the standard variations $\sigma_F$ and $\sigma_O$ to calculate the regularization term R has been described in the embodiment, a distribution characteristic such as variance other than the standard variation may be used. Furthermore, the above-described method of adding the regularization term R may be applied to the first embodiment. In other words, the regularization term R may be added to Formula 7 in the first embodiment.

<Processing Flow of Image Capturing Device>

Figure 15:
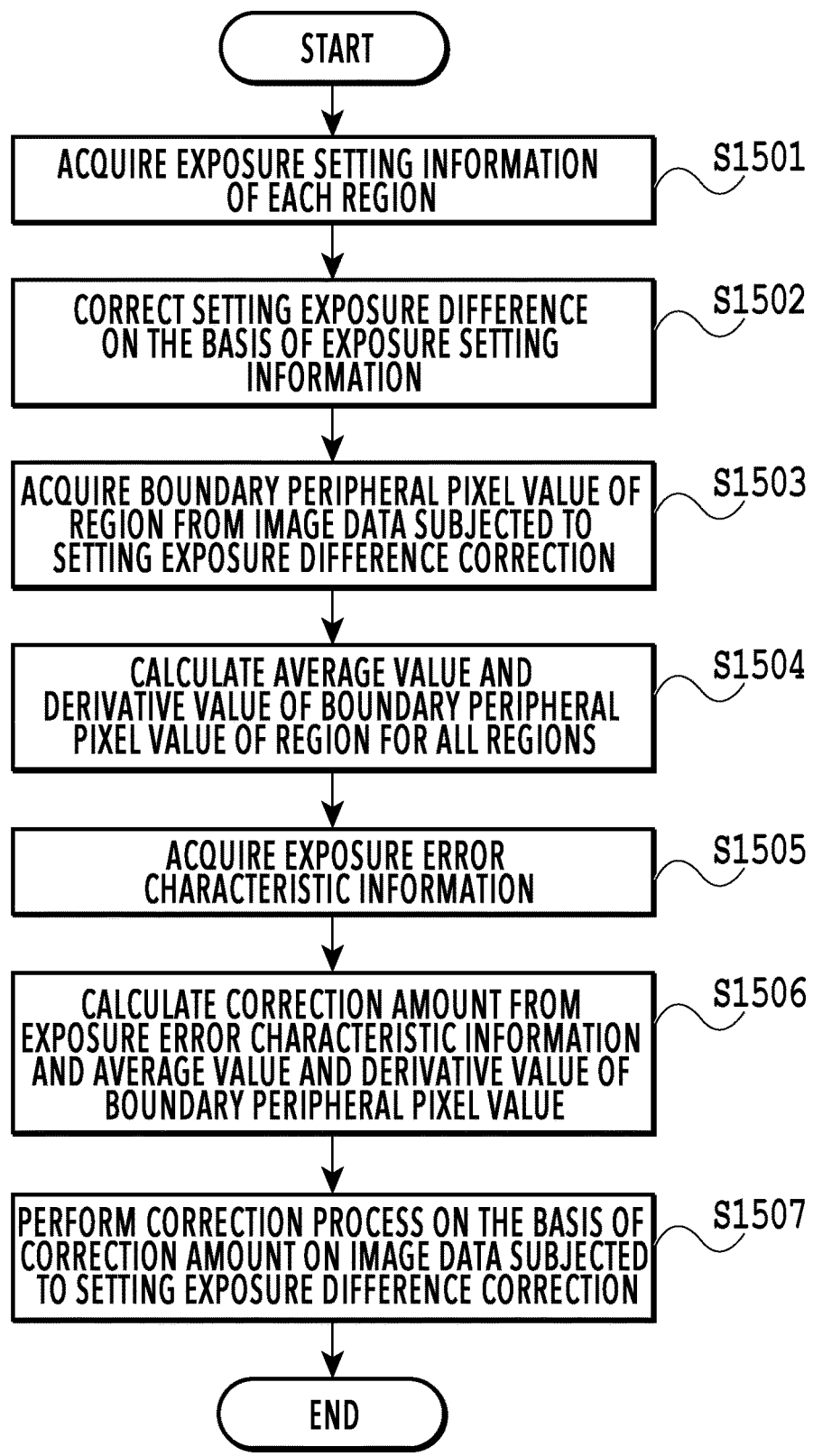
FIG. 15 is a flowchart illustrating operation of an image capturing device according to a third embodiment.

FIG. 15 is a flowchart illustrating operation of an image capturing device according to the third embodiment. FIG. 15 illustrates an operation of the image capturing device after executing the actual image capturing as in FIGS. 9 and 13. Note that processes at S1501 to S1504 and S1507 are the same as the processes at S1301 to S1304 and S1306 and a description thereof will be omitted.

After S1504, the correction value calculation unit 109 obtains the exposure error characteristic information from the ROM 112 (S1505). Next, the correction value calculation unit 109 calculates a correction value on the basis of the exposure error characteristic information received from the exposure error characteristic acquisition unit 1401 and an average value and a derivative value calculated in S1504 (S1506).

As described above, in the embodiment, when estimating the errors $\Delta F_{i,j}$ and $\Delta O_{i,j}$, those values are made not to exceed the predetermined range. Thereby, for example, it is possible to prevent the actual exposure Tn+$\Delta$Tn from being estimated as $\frac{1}{200}$ for exposure setting Tn=$\frac{1}{100}$. Therefore, according to the embodiment, it is possible to obtain a more accurate correction value and to make it more difficult for a false step on the region boundary to occur.

OTHER EMBODIMENTS

In the above-described embodiments, the description has been given as a form in which the boundary peripheral pixel value evaluation unit, correction value calculation unit, and signal processing unit are mounted inside the image capturing device. However, those units may be made a different device from the image capturing device. For example, they may be a personal computer (image processing device) connected to the image capturing device. In this case, the image processing device acquires image data which the image capturing device captured by using an imaging sensor (imaging sensor capable of setting exposure for each region) and information indicating units of a region for which exposure setting is performed or the like. Then, the image processing device may correct the image data using a correction value derived by estimating an exposure setting error on the basis of boundary information on a region on an image represented by the image data.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

If a stacked imaging sensor capable of performing arithmetic operations on a captured image is used, the imaging sensor 103 according to the above-described embodiments and components other than the imaging sensor 103 can be easily integrated. For example, a stacked imaging sensor in which the imaging sensor 103 and boundary peripheral pixel value evaluation unit 108 are integrated is used, it becomes possible to simultaneously acquire image data and an evaluation value. As shown in FIG. 1, in a configuration in which the boundary peripheral pixel value evaluation unit 108 is provided on a chip different from the imaging sensor 103, image data needs to be recorded in the RAM 111 until a correction value is determined. However, if the stacked imaging sensor in which the imaging sensor 103 and boundary peripheral pixel value evaluation unit 108 are integrated as described above is used, the necessity is eliminated.

Although the present invention has been described with reference to the embodiments, it goes without saying that the present invention is not limited to the above-described embodiments. The following claims are to be interpreted most broadly and include all such variations and equivalent structures and functions.

According to the present invention, it is possible to appropriately correct an exposure setting error for each region caused by an imaging sensor and capture good images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing device that corrects an image captured by an imaging sensor capable of setting an exposure condition for each of a plurality of regions, the image processing device comprising:
   at least one memory coupled to at least one processor that is configured to operate as:
   (a) an acquisition unit configured to acquire the image by setting the exposure condition for each region in the imaging sensor;
   (b) a derivation unit configured, regarding a boundary between a region of interest and at least one adjacent region adjacent to the region of interest in the image, to derive a correction amount in the region of interest based on pixel values of a boundary pixel group in contact with the boundary included in the region of interest and pixel values of a boundary pixel group in contact with the boundary included in the adjacent region; and
   (c) a correction unit configured to correct pixel values of pixels in the region of interest based on the derived correction amount,
      wherein the derivation unit derives the correction amount based on an average value of the pixel values of the boundary pixel group in contact with the boundary included in the region of interest and an average value of the pixel values of the boundary pixel group in contact with the boundary included in the adjacent region.

2. The image processing device according to claim 1, that is further configured to operate as a boundary information acquisition unit configured to acquire boundary information indicating a boundary between regions for which the imaging sensor can set exposure,
   wherein the derivation unit derives the correction amount based on the boundary information.

3. The image processing device according to claim 1, wherein the regions have a shape in which a plurality of pixels are disposed in a first direction and a second direction different from the first direction.

4. The image processing device according to claim 1, wherein an image in which pixels corresponding to a plurality of colors are disposed is captured by the imaging sensor, and
   wherein processing by the derivation unit and the correction unit is performed for each of the plurality of colors.

5. An image processing device that corrects an image captured by an imaging sensor capable of setting an exposure condition for each of a plurality of regions, the image processing device comprising:
   at least one memory coupled to at least one processor that is configured to operate as:
   (a) an acquisition unit configured to acquire the image by setting the exposure condition for each region in the imaging sensor;
   (b) a derivation unit configured, regarding a boundary between a region of interest and at least one adjacent region adjacent to the region of interest in the image, to derive a correction amount in the region of interest based on pixel values of a boundary pixel group in contact with the boundary included in the region of interest and pixel values of a boundary pixel group in contact with the boundary included in the adjacent region; and
   (c) a correction unit configured to correct pixel values of pixels in the region of interest based on the derived correction amount, wherein the derivation unit derives an evaluation value that indicates evaluation of a step of gradation occurring on the boundary of each region based on an average value of pixel values of a boundary pixel group in contact with the boundary included in the region of interest and an average value of pixel values of a boundary pixel group in contact with the boundary included in the adjacent region, estimates an exposure setting error in each of the regions based on the evaluation value, and derives a correction value for correcting the estimated exposure setting error.

6. The image processing device according to claim 5, wherein the derivation unit estimates an exposure setting error in each of the regions based on an overall evaluation value obtained by adding the evaluation value corresponding to each of the regions.

7. The image processing device according to claim 6, wherein the derivation unit estimates an exposure setting error in each of the regions that minimizes the overall evaluation value.

8. The image processing device according to claim 5, wherein the derivation unit derives the evaluation value corresponding to the region of interest using an average value and a derivative value of pixel values of a boundary pixel group on the region of interest side and an average value and a derivative value of pixel values of a boundary pixel group on the adjacent region side on the boundary between the region of interest and the adjacent region.

9. The image processing device according to claim 8, wherein the derivation unit derives a derivative value of peripheral pixels on the region of interest side and a derivative value of peripheral pixels on the adjacent region side using peripheral pixels of at least two-pixel width adjacent to the boundary.

10. The image processing device according to claim 5, wherein the derivation unit derives the correction amount after changing the estimated value of the exposure setting error to a value within a predetermined range when the estimated value of the exposure setting error exceeds the predetermined range in which the imaging sensor can take.

11. The image processing device according to claim 10, wherein the derivation unit determines whether the estimated value of the exposure setting error exceeds the predetermined range based on error characteristic information indicating the predetermined range obtained by measuring the imaging sensor in advance.

12. The image processing device according to claim 5, wherein the derivation unit:
derives a regularization term from a distribution characteristic of the exposure setting error in each of the regions obtained by measuring the imaging sensor in advance; and
estimates the exposure setting error in each of the regions based on the evaluation value to which the derived regularization term is added.

13. The image processing device according to claim 5, wherein the derivation unit excludes pixel values corresponding to a saturated pixel and a defective pixel from object pixel values for deriving the evaluation value when deriving the evaluation value.

14. An image processing device that corrects an image captured by an imaging sensor capable of setting an exposure condition for each of a plurality of regions, the image processing device comprising:
at least one memory coupled to at least one processor that is configured to operate as:

(a) an acquisition unit configured to acquire the image by setting the exposure condition for each region in the imaging sensor;
(b) a derivation unit configured, regarding a boundary between a region of interest and at least one adjacent region adjacent to the region of interest in the image, to derive a correction amount in the region of interest based on pixel values of a boundary pixel group in contact with the boundary included in the region of interest and pixel values of a boundary pixel group in contact with the boundary included in the adjacent region; and
(c) a correction unit configured to correct pixel values of pixels in the region of interest based on the derived correction amount,
wherein the derivation unit derives the correction amount after performing a correction process for cancelling out a difference in the exposure condition set for each of the regions on the image acquired by the acquisition unit.

15. The image processing device according to claim 14, wherein the derivation unit performs the correction process on the image acquired by the acquisition unit based on the exposure condition set for each of the regions so that a light amount received by the imaging sensor has a linear relationship with a pixel value of the image acquired by the acquisition unit.

16. A control method of controlling an image processing device that corrects an image captured by an imaging sensor capable of setting an exposure condition for each of a plurality of regions, the control method comprising:
acquiring the image by setting the exposure condition for each region in the imaging sensor;
regarding a boundary between a region of interest and at least one adjacent region adjacent to the region of interest in the image, deriving a correction amount in the region of interest based on pixel values of a boundary pixel group in contact with the boundary included in the region of interest and pixel values of a boundary pixel group in contact with the boundary included in the adjacent region; and
correcting pixel values of pixels in the region of interest based on the derived correction amount,
wherein the derivation derives the correction amount based on an average value of the pixel values of the boundary pixel group in contact with the boundary included in the region of interest and an average value of the pixel values of the boundary pixel group in contact with the boundary included in the adjacent region.

17. A control method of controlling an image capturing device including an imaging sensor capable of setting an exposure condition for each of a plurality of regions, the control method comprising:
acquiring an image by setting the exposure condition for each region by the imaging sensor;
regarding a boundary between a region of interest and at least one adjacent region adjacent to the region of interest in the image, deriving a correction amount in the region of interest based on pixel values of a boundary pixel group in contact with the boundary included in the region of interest and pixel values of a boundary pixel group in contact with the boundary included in the adjacent region; and
correcting pixel values of pixels in the region of interest based on the derived correction amount, wherein the derivation derives an evaluation value that indicates evaluation of a step of gradation occurring on the boundary of each region based on an average value of pixel values of a boundary pixel group in contact with the boundary included in the region of interest and an average value of pixel values of a boundary pixel group in contact with the boundary included in the adjacent region, estimates an exposure setting error in each of the regions based on the evaluation value, and derives a correction value for correcting the estimated exposure setting error.

18. A non-transitory computer readable storage medium storing a program for causing a computer to perform each step in a control method of controlling an image processing device that corrects an image captured by an imaging sensor capable of setting an exposure condition for each of a plurality of regions, the control method comprising:

acquiring the image by setting the exposure condition for each region in the imaging sensor;

regarding a boundary between a region of interest and at least one adjacent region adjacent to the region of interest in the image, deriving a correction amount in the region of interest based on pixel values of a boundary pixel group in contact with the boundary included in the region of interest and pixel values of a boundary pixel group in contact with the boundary included in the adjacent region; and correcting pixel values of pixels in the region of interest based on the derived correction amount, wherein the derivation derives the correction amount based on an average value of the pixel values of the boundary pixel group in contact with the boundary included in the region of interest and an average value of the pixel values of the boundary pixel group in contact with the boundary included in the adjacent region.

* * * * *